(12) United States Patent
Raaf

(10) Patent No.: US 7,130,652 B2
(45) Date of Patent: Oct. 31, 2006

(54) METHOD AND SYSTEM FOR INITIATING A COMMUNICATION

(75) Inventor: Bernhard Raaf, München (DE)

(73) Assignee: Siemens Aktiengesellschaft, Munich (DE)

( * ) Notice: Subject to any disclaimer, the term of this patent is extended or adjusted under 35 U.S.C. 154(b) by 524 days.

(21) Appl. No.: 10/399,155

(22) PCT Filed: Oct. 5, 2001

(86) PCT No.: PCT/EP01/11530

§ 371 (c)(1),
(2), (4) Date: Apr. 10, 2003

(87) PCT Pub. No.: WO02/32010

PCT Pub. Date: Apr. 18, 2002

(65) Prior Publication Data

US 2004/0029604 A1    Feb. 12, 2004

(30) Foreign Application Priority Data

Oct. 10, 2000  (EP) .................................. 00122013

(51) Int. Cl.
*H04Q 7/20* (2006.01)

(52) U.S. Cl. ................ 455/522; 455/115.1; 455/115.3; 455/115.4; 455/69; 455/70

(58) Field of Classification Search ............ 455/69–70, 455/522, 423, 67.1, 67.4, 456, 458, 115.3, 455/115.4, 115.1, 127.2, 425
See application file for complete search history.

(56) References Cited

U.S. PATENT DOCUMENTS

| 5,465,399 | A | | 11/1995 | Oberholtzer et al. |
| 5,903,844 | A | * | 5/1999 | Bruckert et al. ......... 455/456.2 |
| 6,512,931 | B1 | * | 1/2003 | Kim et al. .................. 455/522 |

FOREIGN PATENT DOCUMENTS

EP          0 917 304           5/1999

\* cited by examiner

*Primary Examiner*—Edward F. Urban
*Assistant Examiner*—Tu X. Nguyen
(74) *Attorney, Agent, or Firm*—Bell, Boyd & Lloyd LLC

(57) ABSTRACT

The invention is based in particular on the following concept: to gradually increase the power (power ramping) that is used to send a preamble, said power being limited by at least one extreme value, in such a way that the transmission is repeated with a power that corresponds to the extreme value.

21 Claims, 2 Drawing Sheets

METHOD AND SYSTEM FOR INITIATING A COMMUNICATION

BACKGROUND OF THE INVENTION

The present invention relates to a method and a system for initiating a communication, particularly a communication link. Specifically, the present invention relates to the initiating of closed-loop power control and to a method and a system for controlling power.

In mobile communication systems, it is known to start the initiation of a communication by sending an initiation signal from a mobile station such as, for example, a mobile telephone (also called user equipment (UE)) to a base station (also called node B). The initiation signal can be a so-called RACH (random access channel) message or a preamble; i.e., a specific message preceding a possible RACH message.

A particularly important element of CDMA (code division multiple access) systems such as, for example, the UMTS (Universal Mobile Telecommunications System) is formed by the closed-loop power control. The closed-loop power control method used for the transmission of data here cannot be used for the initiating RACH transmission since it cannot be performed before the transmission begins. For this reason, a so-called open-loop power control method is used for the initiating RACH transmission. Since it is not possible with this method to determine the ideal uplink power (power of a signal which is sent from the mobile station to the base station and arrives at the base station with the power required for reception) with high accuracy, a so-called power ramping method is additionally used in which RACH messages are repeatedly transmitted by the mobile station with increasing power. If the power of the transmitted RACH message is too low, the message is not received by the base station and no acknowledgement message is transmitted from the base station to the mobile station and the transmission of the RACH message from the mobile station to the base station is repeated with higher power. When the power of the RACH message is high enough, the message is received by the base station and an acknowledgement message is transmitted from the base station to the mobile station. Instead of a complete RACH message, it is also possible to send only a shortened signal, a so-called preamble.

Such a method is known, for example, from EP 0917304 A2. In this method, the transmission of an initiating signal is repeated with increasing power, starting from a determined initial power, until either an acknowledgement message is received or the number of repetitions exceeds a threshold value. When an acknowledgement message is received, the transmission of data is continued. If the number of repetitions exceeds a threshold value, the method is begun again with the transmission of an initiating signal with an initial power.

A method of this type which has been developed further is known from "ETSI TS 125.214, V3.4.0-DRAFT (2000-09), UMTS, Physical layer procedures (FDD), (Release 1999)". In this case, the so-called random access procedure is described, in particular in Chapter 6.1, which procedure generally describes the initiation of the communication and, in particular in steps 4 to 7 and 9 to 10, describes the initiation of the closed-loop power control. The initiating message which is sent from the mobile station to the base station is called a preamble in this case. In the text which follows, this method will be explained briefly and, for the purpose of simplification, the steps which are not required for understanding the closed-loop power control method will not be mentioned; in particular, the allocation of various time slots or channels to various mobile stations will not be discussed in greater detail.

In step 4 of the method described in 6.1, a counter for counting the retransmissions of the preamble is set to the value Preamble Retrans Max.

In step 5, the power for the transmission of the preamble is set to the value Preamble Initial Power.

In step 6, a preamble with the "preamble transmission power" power is sent in an access time slot from the mobile station to the base station.

If, in step 7, the mobile station does not detect any acknowledgement message (neither a positive acknowledgement message ("positive acquisition indicator") nor a negative acknowledgement message ("negative acquisition indicator")), the power for transmitting the preamble is increased by $\Delta P_0$=Power Ramp Step [dB] in step 7.3.

In step 7.4, the counter for counting the retransmissions of the preamble is reduced by one.

If, in step 7.5, the counter for counting the retransmissions of the preamble is >0, the method continues at step 6 and, if not, it is found that no acknowledgement message has been received and the procedure is exited.

If a negative acknowledgement message is received, the procedure is exited in step 8.

In step 9, a random access message is transmitted to the base station in the case where a positive acknowledgement message ("positive acquisition indicator") has been received.

In step 10 it is found that the random access message has been transmitted.

In practice, however, the power with which a mobile station is allowed to transmit within a mobile radio system is limited by a maximum power and, when this is exceeded, it can lead to an impairment in the quality of transmission; for example, due to deteriorated phase accuracy or modulation accuracy. In addition, the power can be limited differently from cell to cell in order to reduce interference. Furthermore, the maximum power of a mobile station can be limited by rules of regulation or by a standard to be applied. In addition, mobile stations are not capable of transmitting at an arbitrarily low power. For this reason, minimum powers with which a mobile station must be able to transmit are defined in mobile radio standards.

The present invention is thus directed to a method and a system for initiating a communication, particularly a method and a system for controlling power via which the restrictions with regard to the transmitting power of mobile stations, given in practice, are taken into account in such a manner that, compared with the prior art, less energy is consumed and less interference is caused in the mobile radio system.

SUMMARY OF THE INVENTION

Accordingly, the present invention is based, in particular, on the concept of gradually increasing the power (power ramping) which is used for sending a preamble, the power being limited by at least one extreme value, in such a manner that the transmission is repeated with a power which corresponds to the extreme value.

Retransmission with the same power is advantageous since, apart from transmitting the preamble with a power which is too low, there can be further random or short-term reasons for the fact that no acknowledgement message is received: collision on the transmission channel, abrupt short-term interference, short-term high attenuation or an error in the transmission of the acknowledgement message, etc.

Depending on the variant of the embodiment, the acknowledgement message also can be a positive and/or negative acknowledgement message which also can be designated or implemented as an acknowledgement signal which, for example, can assume only one or two different values.

However, an unlimited retransmission of the preamble with the same power is not useful since each retransmission increases the probability that the reason for no acknowledgement message being received is that the power of the preamble is too low. For this reason, developments of the present invention provide for the retransmission of the preamble with the same power to be ended after a particular number of retransmissions or after another condition occurs.

The maximum extreme value can be specified, for example, by the standard of the mobile radio system within which the present invention is applied.

The minimum extreme value also can be specified, for example, by the standard of the mobile radio system within which the present invention is applied, or by a value specified by a manufacturer of the mobile station which, for example, corresponds to the minimum transmission power which can be achieved by the mobile station (for example, the mobile radio system can specify a value of a minimum transmission power which a mobile station must at least be able to achieve; however, the mobile station is also allowed to be capable of transmitting at lower transmission powers).

Within the context of the present invention, formulations such as "outside a limitation", "inside a limitation", "between a limitation", "greater than", "less than", depending on the variant of the embodiment, can mean that the corresponding limit belongs to the corresponding interval, or that the corresponding limit does not belong to the corresponding interval.

One variant of the embodiment provides for the first calculation of the ideal power, that is to say the initial power at which incrementation is not possible because of a missing preceding reference value, to be replaced by so-called open-loop power control. In this method, the mobile station determines the power with which signals transmitted by the base station arrive at the mobile station and estimates from this the power with which the mobile station has to send a preamble. The first calculated power then corresponds to this initial power determined.

To achieve such object, a system is also provided which has a control device which is set up for carrying out the method and for carrying out corresponding developments.

Additional features and advantages of the present invention are described in, and will be apparent from, the following Detailed Description of the Invention and Figures.

DETAILED DESCRIPTION OF THE INVENTION

Figure 1:
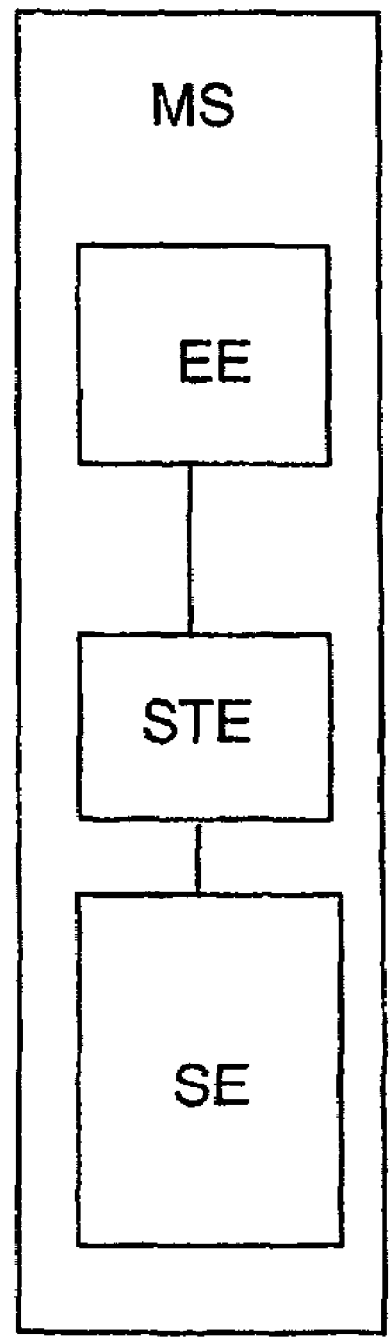
FIG. 1 shows a block diagram of a mobile station.

FIG. 1 shows a mobile station MS such as, for example, a UMTS mobile telephone, with a transmitting device SE for transmitting a preamble and for transmitting control data and useful data and with a receiving device EE for receiving an acknowledgement message and for receiving control data and useful data.

The receiving device and the transmitting device are controlled by a control device STE which may contain a microcontroller with a suitably set up program, or corresponding suitable circuits.

The detailed implementation of the mobile station will not be discussed in greater detail at this point since a mobile station as such is known to an expert in this field and a device of the control device for carrying out the methods within the context of the present invention lies within the scope of expert action if the present application is known.

Figure 2:
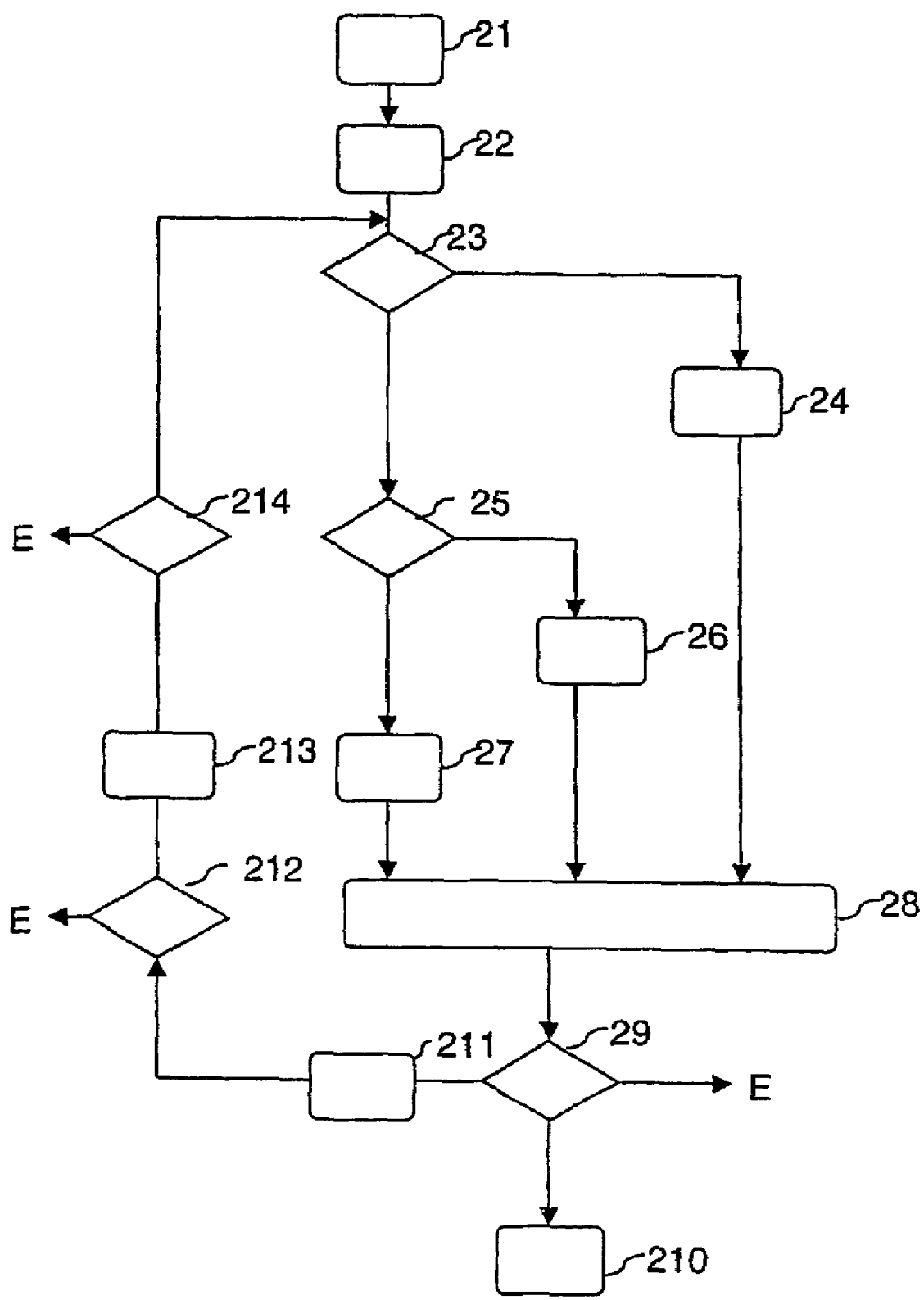
FIG. 2 shows a simplified flowchart of a method for initiating a communication.

FIG. 2 describes the initiation of a communication between a base station and a mobile station which begins with an estimation (open-loop power control) of the initial power of a preamble to be transmitted by the mobile station. After that, the power of the preamble is gradually increased (power ramping) until a base station receives or detects the preamble and sends a corresponding acknowledgement message to the mobile station and the latter receives or detects the acknowledgement message. If an acknowledgement message is received, the method is continued by transmitting an RACH message. The abort criteria for gradually increasing the power of the preamble is when a calculated ideal power for transmitting the preamble exceeds or drops below a counter threshold value or exceeds a maximum extreme power by a threshold value. A second numbering is specified in brackets in order to show clearly the relationship and difference of the method compared with the one initially specified in the ETSI document.

In step 21 (step 4) of the method shown in FIG. 2, a counter for counting the retransmissions of the preamble is set to the value "Preamble Retrans Max".

In step 22 (step 5), the calculated ideal power (commanded power) of the preamble is set to the value Preamble_Initial_Power which is determined by an open-loop power control method.

In step 23 (which supplements step 6), the calculated ideal power is compared with a maximum permissible power (maximum extreme power). If the calculated ideal power is greater than the maximum permissible power, the power of the preamble is set to the maximum permissible power in step 24 and the preamble is transmitted with this power in step 28.

If the calculated ideal power is less than the maximum permissible power or equal to the maximum permissible power, the calculated ideal power is compared in step 25 with a minimum power (minimum extreme power) specified, for example, by the standard of a mobile radio system or by a mobile radio system operator or by a manufacturer. If the calculated ideal power is less than the specified minimum power, the power of the preamble is set, in step 26, to a value which is between the calculated ideal power and the minimum power, and the preamble is transmitted with this power in step 28. This is of advantage, in particular, if the mobile station is capable of transmitting with a power which is less than the prescribed minimum power. A consequence of this step can be that transmission is repeated several times with the same power which is between the calculated ideal power and the minimum power, depending on how far the Preamble Initial Power determined by the open-loop power control is below the specified minimum power. If the open-loop power control estimates a lower initial power for the preamble, this indicates that a preamble sent with this initial power should be receivable with high probability by a base station; however, an unsuccessful transmission (no reception of an acknowledgement message) of a preamble also could be caused by a collision on the transmission channel, an abrupt short-term interference, a short-term high attenuation or an error in the transmission of the acknowledgement message. This is why it is appropriate to retransmit the preamble with the same low power.

If the calculated ideal power is less than the maximum permissible power or equal to the maximum permissible power and greater than the specified minimum power or equal to the specified minimum power, the power of the preamble is set to the value of the calculated ideal power in step 27 and the preamble is transmitted with this power in step 28.

In steps 23 to 28 (step 6), a preamble is thus transmitted with calculated ideal power in an access time slot from the mobile station to the base station; if, during this process, the calculated ideal power (commanded power) of the preamble exceeds the maximum permissible power, the mobile station transmits with the maximum permissible power; if, during this process, the calculated ideal power (commanded power) of the preamble drops below a specified minimum power, the mobile station transmits with a power which is between calculated ideal power (commanded power) of the preamble and the specified minimum power.

In step 29, the mobile station waits for the reception of an acknowledgement message for a particular period of time which can be determined, for example, by a timer sequence.

If no acknowledgement message, also called "acquisition indicator", is received within this period of time (step 7.1), the ideal power is recalculated by incrementing the last ideal power calculated by $\Delta P_0$=Power Ramp Step [dB] in step 211 (step 7.3). In step 212, a check is made as to whether the recalculated ideal power (commanded power) exceeds the maximum permissible power by at least a predetermined threshold value; for example, by at least 6 dB. If this is so, it is found that no acknowledgement message has been received and the procedure is exited, E. One variant of the embodiment provides for the method to be continued in step 212 in this case as well (exceeding by at least one predetermined threshold value such as, for example, 6 dB).

If the recalculated ideal power does not exceed the maximum permissible power by at least the predetermined threshold value in step 212, such as by at least 6 dB, the counter for counting the retransmissions of the preamble is reduced by one in step 213 (step 7.4). If, in step 214 (step 7.5), the new count is greater than zero, the method is continued with step 23; otherwise it is found that no acknowledgement message has been received and the procedure is exited, E.

If, in step 29, a positive acknowledgement message ("positive acquisition indicator") is received, an RACH message is sent to a base station in step 210 (step 9). If, in contrast, a negative acknowledgement message ("negative acquisition indicator") is received in step 29 (step 8), the procedure is exited, E.

The power of signals of a subsequent data transmission is then based on the power of the last preamble transmitted, the reception of which has been acknowledged by an acknowledgement message. The power of this subsequent data transmission which is to be suitably used then depends on its data rate. It can be advantageous to select this power to be higher than the power of the last preamble transmitted, particularly in the case of high data rates. In UMTS, this power difference is designated by the parameter $\Delta P_{p-m}$[dB].

One variant of the embodiment of the present invention provides for the number of retransmissions of the preamble with the maximum permissible power to be counted by a counter in step 212. When a predetermined number is exceeded, the procedure is exited. This also can be implemented by exiting the procedure when the calculated ideal power exceeds a predetermined threshold power Pmax. The difference between the two variants lies in that a change in the increment of the power changes the number of retransmissions in the second case but not in the first case. It is advantageous in the second case that a small increment, which is preferably selected in environments which have a high probability of collisions, leads to many retransmissions which are appropriate especially in these environments.

Another variant of the embodiment of the present invention provides for the power of the preamble to be set to the specified minimum power in step 26.

Another variant of the embodiment of the present invention provides for the retransmission of the preamble with constant power to be aborted after a predetermined number Nmin of retransmissions and for a new ideal power to be calculated by incrementing the power of the last preamble transmitted if the power of the last preamble transmitted is between the minimum extreme power and the calculated ideal power. This prevents futile transmission with too low a power in many retransmissions if, for example, the open-loop power control has determined a value which is much too low as initial power. This can be achieved, for example, by setting the initial power at least to a value which is calculated from the specified minimum power minus Nmin*increment. This leads to Nmin transmissions of the preamble with the specified minimum power followed by transmissions at higher power if no acknowledgement message has been received.

Furthermore, a variant of the embodiment of the present invention provides for the power requirements of a data transmission following the power-control to be taken into account in order to reduce the number of retransmissions of the preamble. As a result, the power ramping procedure can be aborted in advance if the power required for the data transmission is higher than the power required for transmitting the preamble. Thus, there are situations in which the transmission of the preamble with a particular power is successful but a subsequent data transmission would only be appropriate at a much higher or much lower power due to certain circumstances of this data transmission. Thus, for example, a data transmission with a particularly high data rate only can be carried out with a much higher power compared with the power of the RACH message. If this circumstance is known a priori, it may make sense to limit the power of the preamble or of the RACH message, respectively, by a special maximum value which takes this into account. If, for example, the data transmission with high data rate requires a power which is higher by 10 dB than the transmission of the preamble or of the RACH message, respectively, it may make sense to limit the power of the preamble or of the RACH message, respectively, by a value which is 10 dB or 10−x dB below the maximum permissible power.

Apart from the variance of the embodiment of the present invention explained above, a multiplicity of other variants of the embodiment are within the scope of the present invention which will not be described in greater detail here but easily can be applied in practice via the exemplary embodiments explained. In particular, the order of the steps in the methods explained above can be varied, steps can be added or omitted. An example of such a method with varied/added steps is the CPCH access procedure which is described in Chapter 6.2 of the ETSI document initially mentioned. When the present application is known, use of the present invention in the CPCH access procedure lies within the scope of expert action.

Indeed, although the present invention has been described with reference to specific embodiments, those of skill in the art will recognize that changes may be made thereto without departing from the spirit and scope of the present invention as set forth in the hereafter appended claims.

The invention claimed is:

1. A method for controlling power, the method comprising the steps of:
calculating an ideal power;
transmitting a preamble with the ideal power by a mobile station if the ideal power is inside a limitation which is described by one of a maximum extreme power and a minimum extreme power, respectively;
retransmitting the preamble by the mobile station with one of the maximum extreme power and a power which is between the minimum extreme power and the calculated ideal power if the ideal power is outside a limitation which is described by one of the maximum extreme power and the minimum extreme power, respectively;
acknowledging reception of the preamble by a base station by an acknowledgement message which is transmitted from the base station to the mobile station;
aborting the retransmission of the preamble with constant power after a predetermined number of retransmissions; and
calculating a new ideal power of the preamble by incrementation if the acknowledgment message is lacking, wherein the incrementation is executed by incrementing the power of the last preamble transmitted, if the power of the last preamble transmitted is between the minimum extreme power and the calculated ideal power.

2. A method for controlling power as claimed in claim 1, wherein the preamble is transmitted with the maximum extreme power if the calculated ideal power is greater than the maximum extreme power.

3. A method for controlling power as claimed in claim 1, wherein the retransmission of the preamble with the maximum extreme power is limited by a predetermined number of retransmissions.

4. A method for controlling power as claimed in claim 1, wherein the retransmission of the preamble is aborted if the calculated ideal power exceeds the maximum extreme power by at least a predetermined threshold value.

5. A method for controlling power as claimed in claim 1, wherein the ideal power is calculated by incrementing a last ideal power calculated.

6. A method for controlling power as claimed in claim 1, wherein an initial power determined is used as the initial calculated ideal power.

7. A method for controlling power as claimed in claim 1, wherein the preamble is transmitted with the minimum extreme power if the calculated ideal power is less than the minimum extreme power.

8. A method for controlling power as claimed in claim 1, wherein the preamble is transmitted with the minimum extreme power if the calculated ideal power is less than the minimum extreme power.

9. A method for controlling power as claimed in claim 1, wherein the power requirements of a data transmission following the power control is taken into account in order to reduce a number of retransmissions of the preamble.

10. A system for controlling power, comprising:
a transmitting device for transmitting and retransmitting a preamble;
a receiving device for receiving an acknowledgement message; and
a control device for controlling power of the transmitting device, wherein the preamble is transmitted with a calculated ideal power, the preamble being transmitted by the transmitting device with a maximum permissible power if the calculated ideal power is greater than the maximum permissible power, retransmitting the preamble from the transmitting device if the ideal power is outside one of the maximum extreme power and the minimum extreme power, transmitting an access message if an acknowledgement message is received, aborting the retransmission of the preamble if a predetermined number of retransmissions have been attempted, and calculating a new ideal power of the preamble in the control device by incrementation if the acknowledgment message is lacking, wherein the incrementation is executed by incrementing the power of the last preamble transmitted, if the power of the last preamble transmitted is between the minimum extreme power and the calculated ideal power.

11. A method for setting a power of a preamble, the method comprising the steps of:
transmitting the preamble with a calculated ideal power, the preamble being transmitted with a maximum permissible power if the calculated ideal power is greater than the maximum permissible power;
retransmitting the preamble if the ideal power is outside one of the maximum extreme power and the minimum extreme power;
transmitting an access message if an acknowledgement message is received; and
aborting the retransmission of the preamble if a predetermined number of retransmissions have been attempted; and
calculating a new ideal power of the preamble by incrementation if the acknowledgment message is lacking, wherein the incrementation is executed by incrementing the power of the last preamble transmitted, if the power of the last preamble transmitted is between the minimum extreme power and the calculated ideal power.

12. A method for setting a power of a preamble as claimed in claim 11, wherein the method is ended if the calculated ideal power exceeds the maximum permissible power by a predetermined threshold value.

13. A method for setting a power of a preamble as claimed in claim 11, wherein the preamble is transmitted with a power which is between the calculated ideal power and a specified minimum power if the calculated ideal power is less than the specified minimum power.

14. A method for setting a power of a preamble, the method comprising the steps of:
transmitting the preamble with a calculated ideal power, the preamble being transmitted with a power which is between the calculated ideal power and a specified minimum power if the calculated ideal power is less than the specified minimum power;
retransmitting the preamble if the ideal power is outside one of the maximum extreme power and the minimum extreme power transmitting an access message when an acknowledgement message is received; and recalculating the ideal power by incrementation if no acknowledgement message is received, wherein retransmission with the same power is only carried out for a predetermined number of attempts, and wherein a power incrementation based on the last power used is subsequently carried out.

15. A method for initiating a communication via an initiating transmission, the method comprising the steps of:
acknowledging a successful initiating transmission;
repeating the initiating transmission with incremented power if the acknowledgement is lacking; and
limiting a number of retransmissions at power limit values by a predetermined number wherein transmission attempts with the same power are only carried out for a predetermined number of attempts, and a power incrementation based on the last power used is subsequently carried out.

16. A method for initiating a communication via an initiating transmission as claimed in claim 15 wherein the last power used is not incremented, but rather a power which would have been used last if there had been no limitation with regard to a minimum power, and the limitation with regard to a minimum power is taken into account after a next ideal power has been calculated.

17. A method for initiating a communication via an initiating transmission as claimed in claim 15, wherein the initial ideal power is limited by a predetermined value when a lower value would be proposed by an open-loop power control.

18. A method for initiating a communication via an initiating transmission as claimed in claim 15, wherein, at a maximum, a predetermined maximum number of transmission attempts are performed with maximum power.

19. A method for initiating a communication via an initiating transmission as claimed in claim 15, wherein the power with which the transmission would take place is limited to a predetermined magnitude when the limitation with regard to the maximum power of the mobile station is not taken into account.

20. A method for initiating a communication via an initiating transmission as claimed in claim 15, wherein the power requirement for a subsequent transmission is taken into account in order to limit one of the number and the power of the initial transmission attempts.

21. A device for initiating a communication, comprising:
parts for acknowledging a successful initiating transmission;
parts for repeating the initiating transmission with incremented power if the acknowledgment is lacking; and
parts for limiting a number of retransmissions at power limit values by a predetermined number, wherein retransmission attempts with the same power are only carried out for a predetermined number of attempts, and a power incrementation based on the last power used is subsequently carried out.

* * * * *